US 6,622,507 B2

(12) United States Patent
Cotte et al.

(10) Patent No.: US 6,622,507 B2
(45) Date of Patent: Sep. 23, 2003

(54) ELECTROMECHANICAL DEVICE AND A PROCESS OF PREPARING SAME

(75) Inventors: John Michael Cotte, New Fairfield, CT (US); Kenneth John McCullough, Fishkill, NY (US); Wayne Martin Moreau, Wappinger, NY (US); John P. Simons, Wappingers Falls, NY (US); Charles J. Taft, Wappingers Falls, NY (US); Richard P. Volant, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/971,515

(22) Filed: Jul. 26, 2001

(65) Prior Publication Data

US 2003/0019540 A1 Jan. 30, 2003

(51) Int. Cl.[7] ............................................... F25D 23/12
(52) U.S. Cl. .......................................... 62/259.2; 62/31
(58) Field of Search ............................. 62/259.2, 3, 6; 29/592.1

(56) References Cited

U.S. PATENT DOCUMENTS

| 5,323,999 | A | 6/1994 | Bonne et al. |
| 6,164,933 | A | 12/2000 | Tani et al. |
| 6,227,809 | B1 | 5/2001 | Forster et al. |
| 6,272,866 | B1 * | 8/2001 | Tsai et al. ................. 62/3.1 |
| 6,385,973 | B1 * | 5/2002 | Moran .......................... 62/520 |
| 6,443,704 | B1 * | 9/2002 | Darabi et al. ................ 417/50 |

OTHER PUBLICATIONS

Burger et al., 14th IEEE Inter. Conf. Micro Electro Mechanical Systems, 418–421 (Jan. 2001).

* cited by examiner

Primary Examiner—Melvin Jones
(74) Attorney, Agent, or Firm—Scully, Scott, Murphy, Presser; Daniel P. Morris

(57) ABSTRACT

An electromechanical device having a size no larger than about 10 microns utilizing a working fluid in the high pressure liquid or supercritical fluid state. A process of preparing the electromechanical device involves the introduction of the liquid or supercritical fluid therein which permits the retention of the working fluid in the liquid or supercritical state after introduction.

16 Claims, 2 Drawing Sheets

ELECTROMECHANICAL DEVICE AND A PROCESS OF PREPARING SAME

BACKGROUND OF THE DISCLOSURE

1. Field of the Invention

The present invention is directed to an electromechanical (MEMS) device which utilizes a working fluid and a process of making the same. More specifically, the present invention is directed to a MEMS device which utilizes a working fluid having a size no greater than about 10 microns wherein the working fluid is a high pressure liquid or a supercritical fluid and a process of making a MEMS device which involves introducing a high pressure liquid or a supercritical fluid therein.

2. Background of the Prior Art

The development of MEMS devices has significantly advanced in recent years. This development corresponds to the extensive growth in the use of integrated circuits involving semiconductor devices. Although the development of MEMS devices has rapidly developed in recent years, advances in MEMS devices requiring the utilization of a working fluid has been slower. This is because of problems associated with the inability of the working fluid to traverse through openings provided in the MEMS device.

The aforementioned problems have become more pronounced with the development of MEMS of ever decreasing size. Obviously, as newly developed integrated circuits become smaller and smaller, MEMS devices, employed in applications involving integrated circuits, have been required to correspondingly decrease in size. Although the development of MEMS devices of smaller and smaller size has continued apace, as evidenced by such developments as those embodied in U.S. Pat. Nos. 6,164,933 and 6,227,809, which describe micropumps, and U.S. Pat. No. 5,323,999, directed to a micro-sized gas valve, a major deterrent to this development is the constraint provided by the inability of working fluids to flow in micron-sized and even nanometer-sized devices. This is because, as those skilled in the art are aware, of the inability of working fluids to penetrate into such tiny-sized spaces. This, in turn, is the result of the relatively high surface tension of most working fluids. That is, the higher the surface tension of a fluid, the more difficult it is for that fluid to traverse through a very small sized opening.

The technical literature has addressed this problem in the development of MEMS devices. Burger et al., 14$^{th}$ IEEE Inter. Conf. Micro Electro Mechanical Systems, 418–421 (January, 2001) describes a cryogenic micromachined cooler suitable for cooling from ambient temperature to 169° K. and below. The working fluid in this MEMS cooler device is ethylene which is present as a liquid and a gas. The MEMS cooler, however, is attached to a source of ethylene and the system is required to be sealed off in order to maintain specific thermodynamic conditions necessary to retain ethylene under conditions required for cryogenic operation.

Although this cryogenic MEMS machine represents an improvement in MEMS heat exchange technology, it does not provide the requisite mobility, requiring as it does the presence at all times of a source of fresh working fluid, necessary to extend the utility of MEMS devices requiring a working fluid to very small sized devices.

It is thus apparent that there is a significant need in the art for a new MEMS device which utilizes a working fluid, which need not be tethered to a source of the working fluid, having a low enough surface tension so that it can be used in the ever smaller sizes required of newly developed MEMS devices.

BRIEF SUMMARY OF THE INVENTION

A new MEMS device requiring the use of a working fluid and a method of producing the same has now been developed which is characterized by the use of a working fluid having very low surface tension such that the MEMS device may be as small as nanometer-sized. The MEMS device provided with a working fluid, although capable of flowing through all openings provided in the MEMS device, is also characterized by the self contained nature of the working fluid. That is, the MEMS device is unattached to any working fluid source, representing as it does a true closed loop system, wherein the working fluid provides the same operability associated with MEMS devices of the prior art which require an appended working fluid source.

In accordance with the present invention a microsized MEMS device which utilizes a working fluid is provided. The working fluid is a high pressure liquid or a supercritical fluid. The MEMS device is provided with a connecting device which not only acts to permit introduction of the working fluid under thermodynamic conditions consistent with the maintenance of the fluid in the liquid or supercritical state but which maintains the fluid under those conditions even after removal of those thermodynamic conditions.

In further accordance with the present invention a process of providing a MEMS device having a size no greater than about 10 microns utilizing a working fluid is provided. In this process a high pressure liquid or a supercritical fluid is introduced into the micron-sized MEMS device utilizing a working fluid under thermodynamic conditions consistent with the maintenance of the working fluid in the liquid or supercritical state. High pressure liquid or supercritical fluid is introduced into the MEMS device until the pressure of the liquid or supercritical fluid in the MEMS device reaches the pressure of the liquid or supercritical fluid source. Thereupon, a device provided in the MEMS device closes and seals the working fluid in the MEMS device from the source, trapping the working fluid therein. The thermodynamic conditions are thereupon changed to ambient. However, the working fluid in the MEMS device remains in the liquid or supercritical state.

BRIEF DESCRIPTION OF THE DRAWINGS

The present invention may be better understood by reference to the accompanying drawings of which.

DETAILED DESCRIPTION

Figure 1:
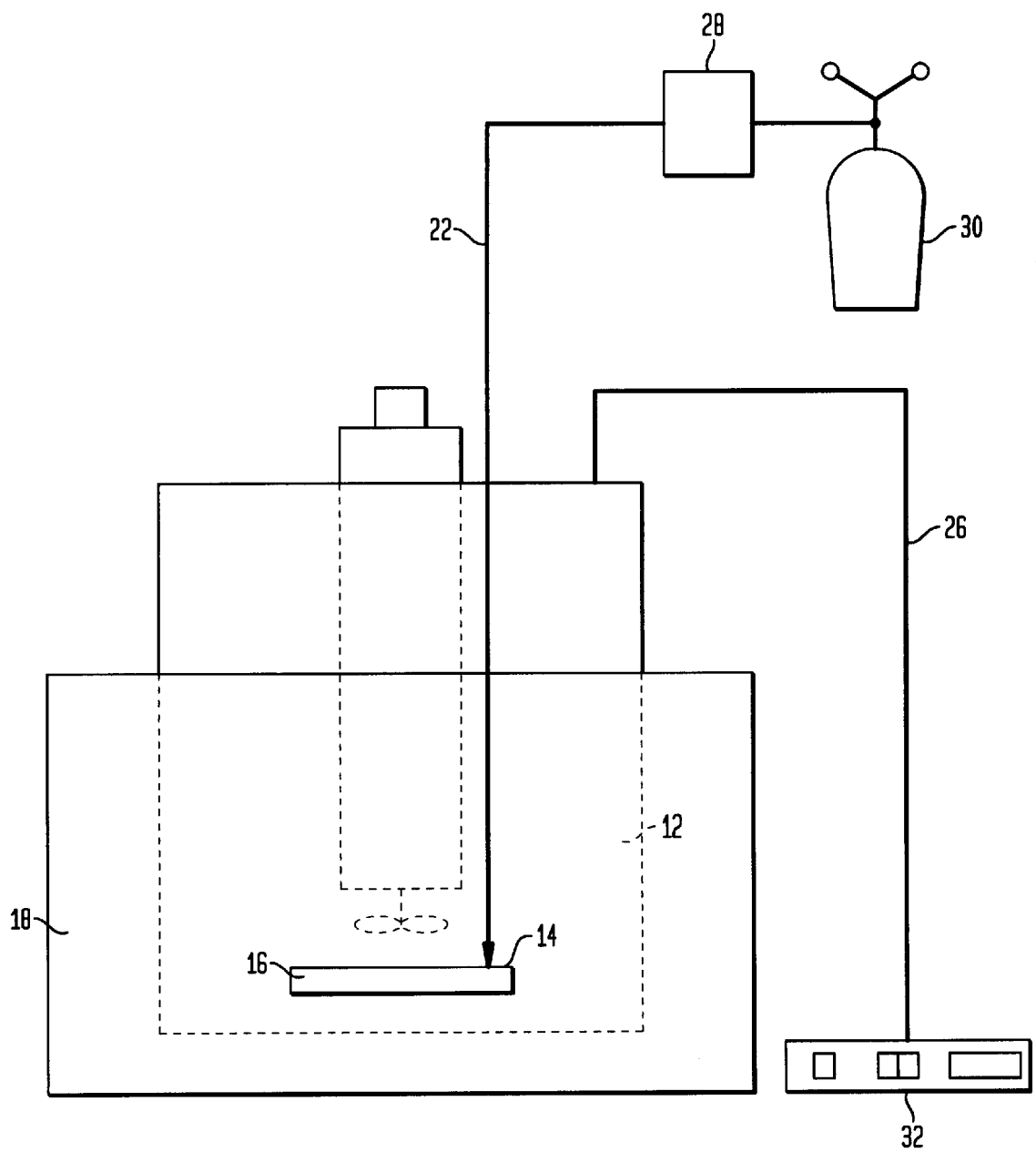
FIG. 1 is a schematic representation of an apparatus suitable for introducing a high pressure liquid or a supercritical fluid into a MEMS device.
Figure 2:
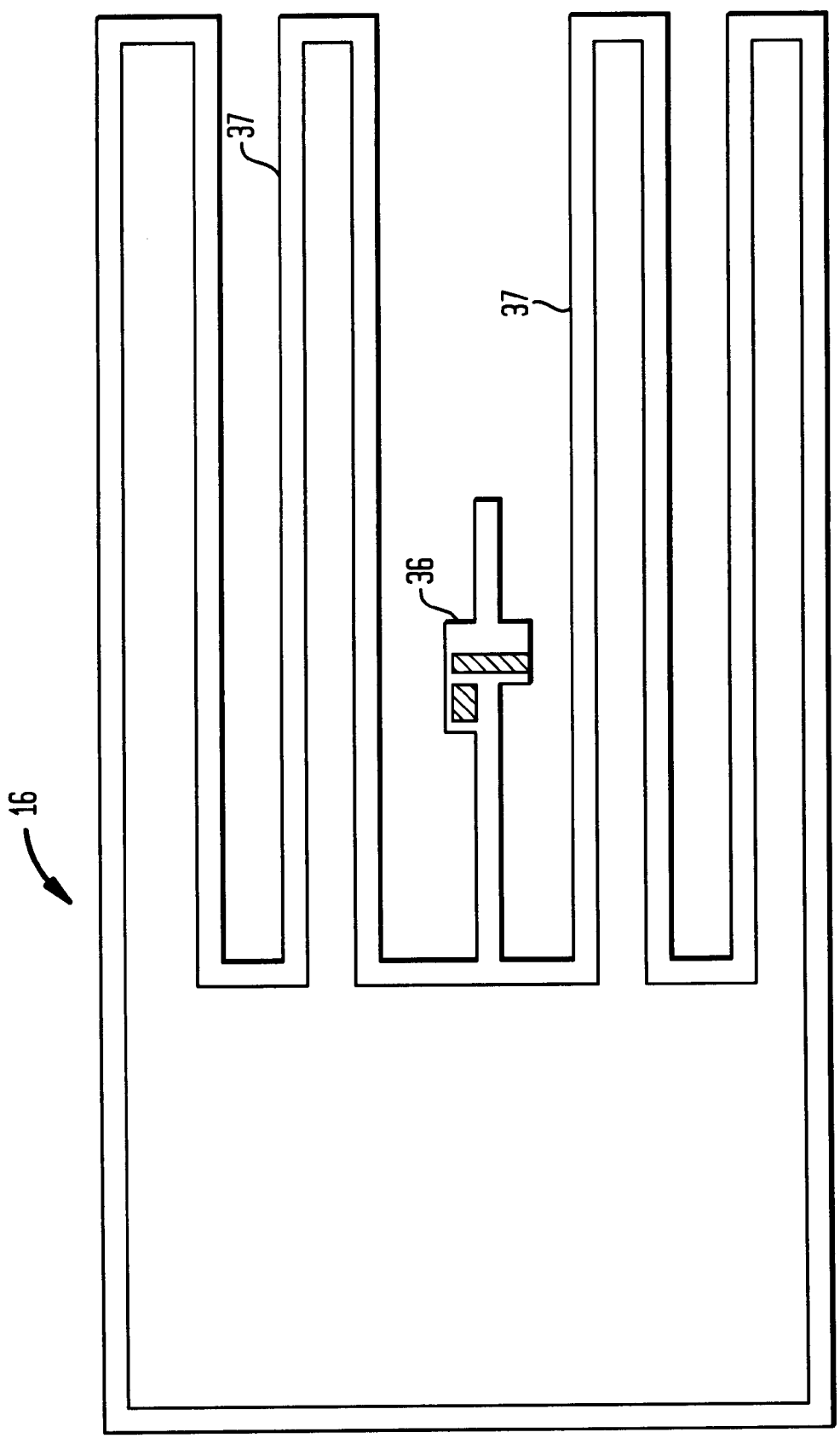
FIG. 2 is a schematic representation of an aspect of a MEMS device illustrating means for introducing a liquid or a supercritical fluid therein.

A MEMS device which requires the utilization of a working fluid is depicted by reference numeral 16. During introduction of the working fluid MEMS device 16 is disposed in a filling zone 14 of a processing chamber 12. Therein a high pressure liquid or supercritical fluid from a source 30 is introduced into device 16. To ensure that the liquid or supercritical fluid remains in the liquid or supercritical state during introduction, thermodynamic conditions in processing chamber 12 are maintained under conditions which insure retention of the fluid in the liquid or supercritical state. Those thermodynamic conditions are a function of the physical characteristics of the working fluid. For example, when the working fluid is carbon dioxide, neon, nitrogen, argon, xenon, sulfur hexafluoride or propane, processing chamber 12 is maintained at a pressure in the range of between about 1,000 psi and about 8,000 psi. More preferably, the pressure within the processing chamber 12 is in the range of between about 2,000 psi and about 5,000 psi. At this pressure an additional fluid, ammonia, may be utilized. Still more preferably, the pressure within processing chamber 12 is about 3,000 psi. It is at this pressure that the most preferred working fluid, carbon dioxide, is most usefully employed. The temperature within processing chamber 12 is maintained in a range of between about 32° C. and about 100° C. Preferably, the temperature within processing chamber 12 is maintained in a range of between about 50° C. and about 80° C. Still more preferably, the temperature within processing chamber 12 is in the range of about 70° C.

Since it is critical that the aforementioned thermodynamic conditions be maintained during the filling of the working fluid into the MEMS device 16, processing chamber 12 may be controlled by a heat controller 32 which has the capability of monitoring the temperature therein by means of a thermocouple 26. The measured temperature is adjusted by heat jacket 18, controlled by controller 32, in accordance with temperature control means well known in the art.

As stated above, a high pressure liquid or supercritical fluid is introduced into MEMS device 16, disposed in filling zone 14 of processing chamber 12. This fluid, introduced into MEMS device 16, is provided by a liquid or supercritical fluid source 30. As shown in FIG. 1, the liquid or supercritical fluid source 30 may be prepressurized by a pump 28, disposed downstream of the source of the liquid or supercritical fluid 30. The high pressure liquid or supercritical fluid is conveyed into filling zone 14 of processing chamber 12 by means of a connecting means 36 provided as part of MEMS device 16 as discussed below.

Turning now to the MEMS device 16, that device is disposed in processing chamber 12, which, as indicated above, is maintained under conditions which are suitable for the maintenance of the working fluid in the liquid or supercritical state. The MEMS device 16 includes a plurality of conduits 37 into which a liquid or supercritical fluid is introduced. The liquid or supercritical fluid is introduced through a connecting means 36 provided on the device 16. The connecting means 36 operates on the principle of a check valve. Indeed, a check valve suitable for introducing a liquid or supercritical fluid into a MEMS device is described in copending U.S. patent application, Ser. No. 09/915,786, filed Jul. 26, 2001, incorporated herein by reference.

It is emphasized that check valve designs other than those set forth in copending U.S. patent application, Ser. No. 09/915,786, filed Jul. 26, 2001, as the connecting means 36 component of MEMS device 16, wherein the check valve principle, underlying the embodiments detailed therein, may be utilized.

The introduction of a liquid or a supercritical fluid into MEMS device 16 in processing chamber 12 is completed when the pressure of the high pressure liquid or supercritical fluid in MEMS device 16 is equal to the pressure of the source 30. At this point the MEMS working fluid, the liquid or supercritical fluid, is fully charged into MEMS device 16.

Thereupon, in accordance with the operation of connecting means 36, as discussed in copending U.S. patent application, Ser. No. 09/915,786, the conduit between the source of liquid or supercritical fluid and the MEMS device 16 is closed by the closing of a plug in connecting means 36 trapping the working fluid therein. Thus, the working fluid is held in MEMS device 16 at the pressure of its introduction. Therefore, the next step, the removal of thermodynamic conditions consistent with the maintenance of the working fluid in the high pressure liquid or supercritical fluid state, does not change the state of the working fluid in MEMS device 16 insofar as that fluid is trapped therein under the pressure at which it was introduced therein. Stated differently, the replacement of the thermodynamic conditions consistent with the maintenance of high pressure liquid or supercritical fluid conditions in processing chamber 12 with those of ambient does not change the pressure of the liquid or supercritical working fluid in MEMS device 16. Hence, the working fluid remains a liquid or supercritical fluid.

Examples of MEMS devices requiring a working fluid, within the contemplation of the present invention, include a heat exchanger, a closed loop pumping apparatus, a closed loop hydraulic system and the like.

The MEMS device, as suggested previously, is no larger than micron-sized. That is, the size of the MEMS device is no larger than about 10 microns. More preferably, the maximum size of the MEMS device is no larger than about 1 micron.

The above embodiments are given to illustrate the scope and spirit of the present invention. These embodiments will make apparent, to those skilled in the art, other embodiments and examples. These other embodiments and examples are within the contemplation of the present invention. Therefore, the present invention should be limited only by the appended claims.

What is claimed is:

1. A process of making an electromechanical device utilizing a working fluid comprising the steps of:

introducing a high pressure liquid or supercritical fluid into an electromechanical device utilizing or working fluid having a size no greater than about 10 microns from a source of said liquid or supercritical fluid under thermodynamic conditions consistent with the maintenance of said fluid in the liquid or supercritical state;

stopping said introduction of said liquid or supercritical fluid when the pressure of said fluid in said electromechanical device equals the pressure of said liquid or supercritical fluid source;

closing, concurrently with said fluid introduction stoppage, said ingress and egress into said electromechanical device; and adjusting said thermodynamic conditions to ambient wherein said working fluid in said electromechanical device is retained in the high pressure liquid or supercritical state.

2. A process in accordance with claim 1 wherein said pressure of said liquid or supercritical fluid source is in the range of between about 1,000 psi and about 8,000 psi.

3. A process in accordance with claim 2 wherein said liquid or supercritical fluid is selected from the group consisting of carbon dioxide, neon, nitrogen, argon, xenon, sulfur hexafluoride and propane.

4. A process in accordance with claim 2 wherein said pressure of said liquid or supercritical fluid is in the range of between about 2,000 psi and about 5,000 psi.

5. A process in accordance with claim 4 wherein said liquid or supercritical fluid is selected from the group consisting of carbon dioxide, neon, nitrogen, argon, xenon, sulfur hexafluoride, propane and ammonia.

6. A process in accordance with claim 4 wherein said pressure of said liquid or supercritical fluid is about 3,000 psi.

7. A process in accordance with claim 6 wherein said liquid or supercritical fluid is carbon dioxide.

8. A microelectromechanical device comprising an electromechanical device utilizing a working fluid, said device being no larger than about 10 microns, said working fluid being a high pressure liquid or supercritical fluid.

9. A device in accordance with claim 8 wherein said device is no larger that about 1 micron.

10. A device in accordance with claim 8 wherein said liquid or supercritical fluid is selected from the group consisting of carbon dioxide, neon, nitrogen, argon, xenon, sulfur hexafluoride, propane and ammonia.

11. A device in accordance with claim 10 wherein said liquid or supercritical fluid is selected from the group consisting of carbon dioxide, neon, nitrogen, argon, xenon, sulfur hexafluoride and propane.

12. A device in accordance with claim 11 wherein said liquid or supercritical fluid is at a pressure in the range of between about 1,000 psi and about 8,000 psi.

13. A device in accordance with claim 10 wherein said liquid or supercritical fluid is at a pressure in the range of between about 2,000 psi and about 5,000 psi.

14. A device in accordance with claim 13 wherein said liquid or supercritical fluid is at a pressure in the range of about 3,000 psi.

15. A device in accordance with claim 12 wherein said liquid or supercritical fluid is carbon dioxide.

16. A device in accordance with claim 8 wherein said microelectromechanical device is a heat exchanger, a closed loop pumping apparatus or a closed loop hydraulic system.

* * * * *